United States Patent [19]
Agari et al.

[11] Patent Number: 5,649,769
[45] Date of Patent: Jul. 22, 1997

[54] LINEAR MOTION ROLLING GUIDE UNIT

[75] Inventors: Norimasa Agari, Seki; Seiji Takei, Yokohama, both of Japan

[73] Assignee: Nippon Thompson Co., Ltd., Tokyo, Japan

[21] Appl. No.: 597,932

[22] Filed: Feb. 7, 1996

[30] Foreign Application Priority Data

Feb. 23, 1995 [JP] Japan .................... 7-058223

[51] Int. Cl.$^6$ ............................................ F16C 29/06
[52] U.S. Cl. ............................................ 384/45
[58] Field of Search ............................ 384/45, 43, 49, 384/51

[56] References Cited

U.S. PATENT DOCUMENTS

| | | | |
|---|---|---|---|
| 4,557,530 | 12/1985 | Haase | 384/45 |
| 4,784,498 | 11/1988 | Geka et al. | 384/45 |
| 4,797,012 | 1/1989 | Tanaka | 384/45 |
| 5,123,754 | 6/1992 | Tanaka | 384/45 |
| 5,340,219 | 8/1994 | Agari | 384/45 X |

FOREIGN PATENT DOCUMENTS

| | | |
|---|---|---|
| 63-26577 | 7/1988 | Japan . |
| 63-171722 | 11/1988 | Japan . |
| 1-92522 | 6/1989 | Japan . |
| 4-370414 | 12/1992 | Japan . |

*Primary Examiner*—Thomas R. Hannon
*Attorney, Agent, or Firm*—Browdy and Neimark

[57] ABSTRACT

A linear motion rolling guide unit in which the ball retaining capability of retainer bands for retaining balls is improved by increasing the holding area and rigidity thereof. Each of the retainer bands extends along the relative raceway groove in a casing, and is fitted in a non-contacting state, i.e., loosely in the relative retainer band fitting groove formed along a raceway groove in a side surface of a track rail, the retainer band being formed so that both of longitudinal corner portions thereof which continue from the ball retaining surface thereof have an acute angle. The width of the ball retaining ball-opposed surface of the retainer band is set larger than that of a rear surface thereof which is on the opposite side of the ball retaining surface, i.e., the retainer band is formed to a substantially trapezoidal cross-sectional shape.

9 Claims, 5 Drawing Sheets

LINEAR MOTION ROLLING GUIDE UNIT

BACKGROUND OF THE INVENTION

1. Field of the Invention

This invention relates to a linear motion rolling guide unit applied to a machine tool, an industrial robot, a precision machining apparatus and a semiconductor manufacturing apparatus, wherein rolling elements rolling between raceway grooves formed in a track rail and a casing which are adapted to be moved slidingly with respect to each other are retained by retainer bands.

2. Description of the Prior Art

There is a known linear motion rolling guide unit shown in FIGS. 8 and 9. This linear motion rolling guide unit is formed by a track rail 2 provided with raceway grooves 4 in both of longitudinal side surfaces 3 thereof, and a slider 1 saddled slidably on the track rail 2. The slider 1 is slidable relatively to the track rail 2 and has a casing 5 provided in the portions thereof which are opposed to the raceway grooves 4 with raceway grooves 9, balls 7 constituting a plurality of rolling elements fitted relatively movably between the opposed raceway grooves 4, 9, and end caps 6 fixed to both ends with respect to the sliding direction, i.e. longitudinal direction of the casing 5. Side seals 17, which attain the sealing of narrow clearances between the track rail 2 and slider 1, are attached to the end caps 6, and grease nipples 23 for supplying a lubricant to the slide surfaces between the track rail 2 and slider 1 are also fixed to the same.

In order to prevent the balls 7 from falling from the casing 5, retainer bands 15 are fixed to the slider 1 so as to surround the balls 7. The track rail 2 is provided with retainer band grooves 16 extending along the raceway grooves 4 in the side surfaces 3. As shown in FIG. 10, the conventional retainer band 15 is provided in the casing 5 so that the retainer band 15 extends along the relative raceway groove 9 in the casing 5 and is loosely fitted in the relative retainer band groove 16 in the track rail 2. The retainer band 15 is formed to a rectangular cross sectional shape, or formed by using a rod material to a circular or semicircular cross-sectional shape (refer to, for example, Japanese Utility Model Publication No. 26577/1988).

Lower seals 8 are provided on the casing 5 so as to reliably prevent the balls 7 from falling from the casing 5 and seal both of the longitudinal side surfaces 3 of the casing 5 and track rail 2 and a lower surface of the casing 5. The slider 1 is provided in a saddled state on the track rail 2, and adapted to be slid freely via the balls 7 circulating along the raceway grooves 4 in the track rail 2. The balls 7 in load regions which roll in the raceway grooves 4 in the track rail 2 are introduced into direction changing passages 11 formed in the end caps 6, and they are then moved into return passages 12 formed above and in parallel with the raceway grooves 9 in the casing 5, whereby a plurality of balls 7 are circulated endlessly in the endless circulating passages. Owing to such rolling movements of the loaded balls 7 positioned between the raceway grooves 9 formed in the casing 5 and those 4 formed in the track rail 2, the slider 1 can be slid relatively to the track rail 2.

Japanese Utility Model Publication No. 26577/1988 also discloses ball retainers for linear motion ball bearings. These ball retainers comprise thin metal rod materials the height of a cross section of which is larger than the width of the rod materials, and are positioned close to the outer sides of the balls on the raceway surfaces of a slide unit. Each ball retainer is formed to a lip-carrying C-shaped structure comprising a straight rod type main portion fixed in parallel with the balls, bent portions connected to both ends of the main portion at right angles thereto, and short hook portions bent in the shape of lips in the inward direction from and joined to free ends of the bent portions. The ball retainer is held in a hooked state on the slide unit owing to the elastic force of the thin rod type main portion and bent portions. The ball retainer has a cross-sectionally rectangular shape shown in FIG. 10.

Japanese Utility Model Laid-Open No. 171722/1988 discloses a linear guide apparatus. A wire retainer in this linear guide apparatus is provided with an axially extending wire retaining bore in a base portion of a ball scooping projection of an end cap. It is further provided with a ball guide portion comprising a linear part, and arcuate parts at both ends of the linear part, and fixing portions parallel-extending axially from the ends of the arcuate parts and inserted through the wire retaining bore. This publication discloses a circular or plate type wire retainer.

Japanese Patent Laid-Open No. 370414/1992 discloses a linear motion rolling guide unit having a high sealability. In this linear motion rolling guide unit, it is necessary that the sealing performance thereof be improved. In order to meet this requirement, retainer band fitting grooves in a track rail are grind-finished by a grindstone. In order to carry out such a machining process easily, the retainer band fitting grooves are formed to a trapezoidal cross-sectional shape.

Japanese Utility Model Laid-Open No. 92522/1989 discloses a cross roller type linear motion rolling guide unit in which the rotational axes of adjacent rollers constituting rolling elements cross each other at 90° alternately. In this linear motion rolling guide unit, the inner surfaces of retainers are formed as right-angled V-shaped groove surfaces so as to support the angled portions of the crossed rollers.

In recent years, a compact linear motion rolling guide unit of smaller dimensions having a large load capacity has been demanded. To meet this demand, the length of a casing of a slider is increased to obtain a large load capacity but the length of ball retaining bands increases accordingly and necessarily. When the retainer bands become longer, they become liable to be bent, so that the balls fall from the raceway grooves in the casing.

The conventional retainer bands are formed to a rectangular cross-sectional shape as shown in FIG. 10, or formed by using a rod material to a circular or semicircular cross-section 1 shape. The retainer bands 15 are usually tensed so as to hold a plurality of balls 7 and prevent them from falling from the raceway grooves in the casing 5. However, when the retainer bands 15 are deformed during an operation for setting the slider 1 on the track rail 2 or removing the former from the latter, so that distances between the terminal corner portions of a raceway groove 9 in the casing 5 and the corner portions of a side surface of the relative retainer band 15, i.e. the distances C, D become larger than the diameter of each ball 7, the balls 7 necessarily fall from the raceway groove 9 in the casing 5.

In recent years, the reduction of the cost of manufacturing a linear motion rolling guide unit has progressed, and the retainer band fitting grooves formed in a track rail tend to be formed shallowly. Moreover, the lengths of a casing and retainer bands have increased because of the necessity of increasing the load capacity as mentioned above. This causes a decrease in the rigidity of the retainer bands, and the retainer bands to be deformed. Consequently, the balls fall from the raceway grooves.

SUMMARY OF THE INVENTION

An object of the present invention is to solve these problems, and provide a linear motion rolling guide unit in which the rigidity of retainer bands is increased to as great an extent as possible by forming the retainer band fitting grooves in a track rail to the smallest possible width and the retainer bands to such a high-rigidity shape that substantially permits the retainer bands not to contact the retainer band fitting grooves and that is other than a rectangular shape, whereby the ball retaining performance of the retainer bands is improved.

The linear motion rolling guide unit according to the present invention is provided with a track rail having first raceway grooves in both of longitudinal side surfaces thereof; a casing saddled on and slidable relatively to the track rail and having second raceway grooves opposed to the first raceway grooves, and return passages spaced from the second raceway grooves; end caps attached to both of longitudinal ends of the casing and having direction changing passages to allow the second raceway grooves and the return passages to communicate with each other; side seals provided on end surfaces of the end caps; raceway passages formed between the opposed first and second raceway grooves; balls rolling circulatingly in the direction changing passages and return passages; and retainer bands adapted to retain the balls in the second raceway grooves in the casing, the retainer bands extending along the second raceway grooves in the casing and being fitted loosely in retainer band fitting grooves formed along the first raceway grooves in the side surfaces of the track rail, both of longitudinal corner portions of the retainer bands which extend continuously from ball retaining surfaces thereof being formed acutely so as to increase the bending rigidity of the retainer bands.

In this linear motion rolling guide unit, the retainer bands extend along the second raceway grooves in the casing and are fitted loosely in the retainer band fitting grooves formed along the first raceway grooves in the side surfaces of the track rail, and both of longitudinal corner portions continuing from the ball retaining surfaces of the retainer bands are formed acutely. Accordingly, both of longitudinal side portions of the retainer bands are formed to larger-thickness longitudinally-extending structures as compared with central portions thereof. These retainer bands enable the rigidity, bending strength, deformation resistance and ball retainability thereof to be improved as compared with a conventional retainer band of a rectangular cross section.

In each of the retainer bands according to the present invention, the width of the ball retaining surface is set larger than that of the opposite surface, i.e., the retainer band is formed so as to have a substantially trapezoidal cross section. Therefore, a ball holding area and bending strength of the retainer band can be increased, so that the falling of the balls from the second raceway grooves in the casing can be prevented.

The ball retaining surfaces of the retainer bands have arcuately recessed surfaces between both of the corner portions in the longitudinal direction of the retainer bands.

Each of the retainer band fitting grooves formed in the track rail is formed so that both of the corner portions in the longitudinal direction thereof have curved surfaces.

Each of the retainer bands is chamfered at both of the corner portions in the longitudinal direction thereof which continue from the surface of the retainer band which is on the opposite side of the balls, in such a manner that the contour of a cross section of the retainer band is in conformity with that of a cross section of the retainer band fitting groove.

Both ends of each retainer band are held between and fixed to the end caps and side seals.

In this linear motion rolling guide unit, the retainer bands are fitted loosely, i.e., in a non-contacting state in the retainer band fitting grooves extending along the second raceway grooves in the casing and formed along the first raceway grooves in the track rail, and both of the corner portions of the retainer bands in the longitudinal direction thereof and continuing from the ball retaining and ball-opposed surfaces are formed acutely. Accordingly, the ball holding area can be increased by about 4–16%, and the second moment of area increases by about 7–241%. The retainer bands in this invention are capable of increasing the holding area, rigidity and bending strength, i.e. deformation resistance, and improving the ball retaining function as compared with the conventional retainer bands of a cross-sectionally rectangular shape. Especially, the retainer bands in the present invention are formed so that the width of the ball retaining ball-opposed surfaces is set larger than that of the rear surfaces on the opposite sides, i.e., they are formed so as to have a substantially trapezoidal cross section. Therefore, it is possible to increase the bending strength of the retainer bands, prevent the falling of the balls from the second raceway grooves in the casing, especially, when the slider is set on and removed from the track rail, and carry out easily the handling of the slider and the fixing and removing of the slider on and from the track rail.

DESCRIPTION OF THE PREFERRED EMBODIMENTS

Figure 1:
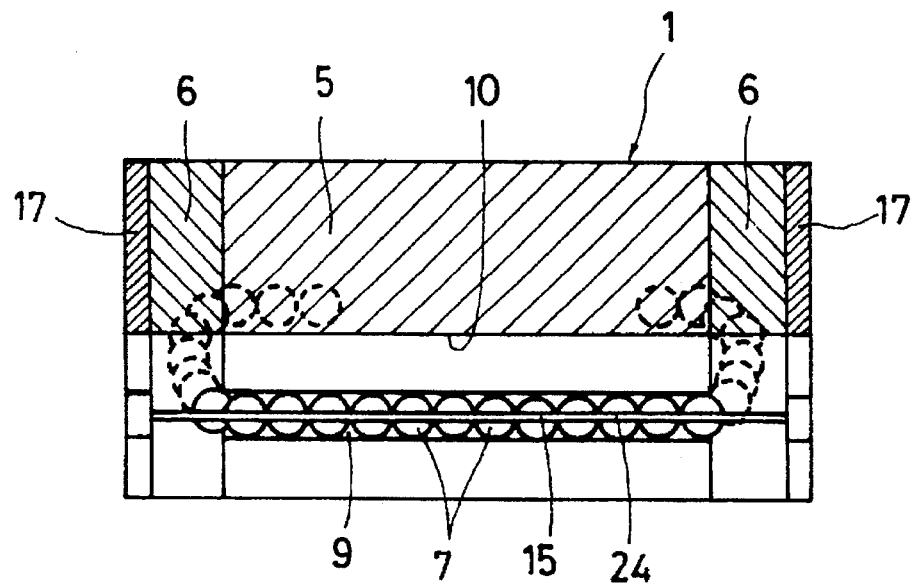
FIG. 1 is a schematic explanatory drawing showing an inner portion of an embodiment of the linear motion rolling guide unit according to the present invention.

An embodiment of the linear motion rolling guide unit according to the present invention will now be described with reference to the drawings. Referring to each drawing, the parts having the same operations as those shown in FIGS. 8 and 9 are designated by the same reference numerals.

Figure 8:
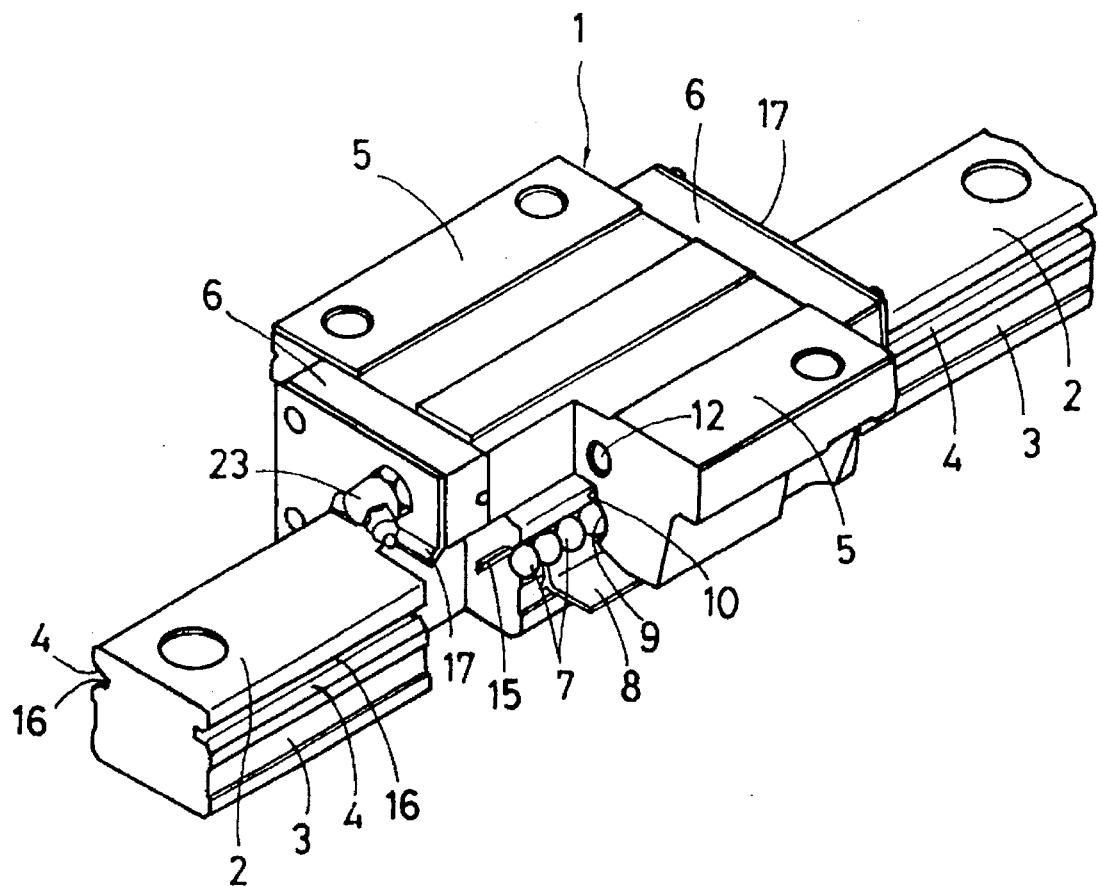
FIG. 8 is a partially cutaway perspective view showing an example of a conventional linear motion rolling guide unit.
Figure 9:
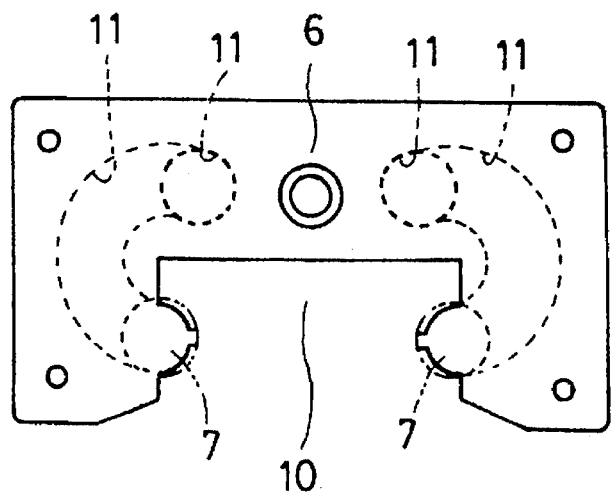
FIG. 9 is a front view of an end cap incorporated in the linear motion rolling guide unit of FIG. 8.

The linear motion rolling guide unit according to the present invention has basically the same construction as that shown in FIG. 8, and is characterized by the construction of retainer bands 15 in the mentioned structure. Since the linear motion rolling guide unit according to the present invention has the same construction as that shown in FIG. 8, it will be described with reference to FIGS. 1, 2, 3, 8 and 9.

Figure 2:
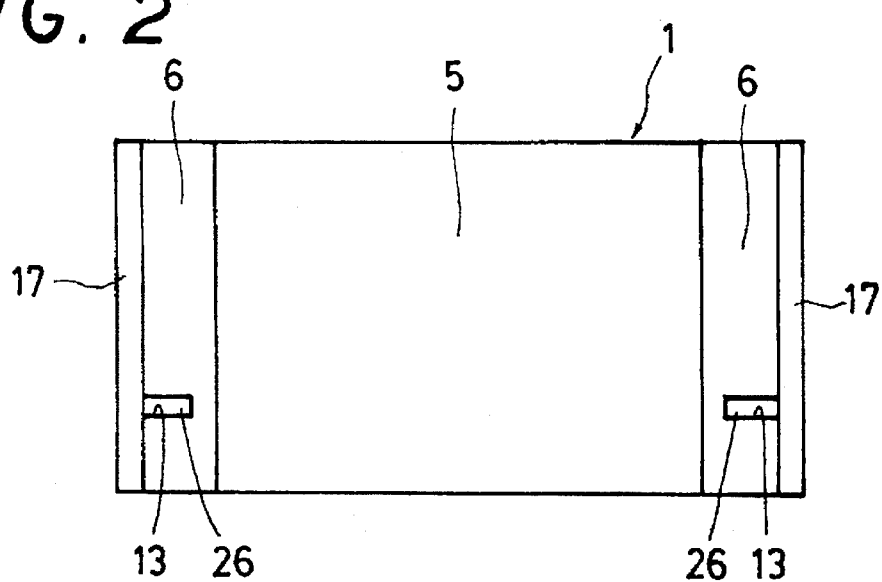
FIG. 2 is a side view of the linear motion rolling guide unit of FIG. 1.
Figure 3:
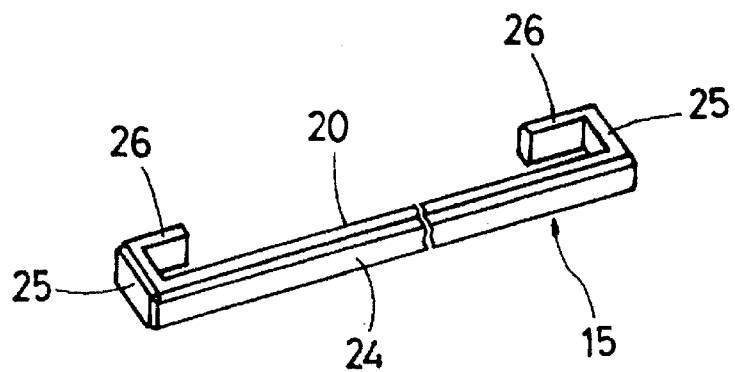
FIG. 3 is a perspective view of a retainer band to be incorporated into the linear motion rolling guide of FIG. 1.

The linear motion rolling guide unit of FIGS. 1–3 is formed by a track rail 2 provided with raceway grooves 4 in both of longitudinal side surfaces 3, and a slider 1 saddled on and slidable relatively to the track rail 2. The slider 1 is saddled on the track rail and slidable relatively thereto, and has a casing 5 provided with raceway grooves 9 in the portions thereof which are opposed to the raceway grooves 4, a plurality of balls 7 rolling in raceway passages formed between the opposed raceway grooves 4, 9, end caps 6 attached to both of the longitudinal ends of the casing 5, side seals 17 fixed to end surfaces of the end caps 6, and lower seals 8 provided on the slider 1.

The casing 5 has return passages 12 in the portions thereof which are spaced from the raceway grooves 9. The end caps 6 are attached to both of the longitudinal end surfaces of the casing 5 by driving screws into a plurality of mounting holes, and provided on both sides of the inner portions thereof with direction changing passages 11 communicating with the raceway grooves 9 and return passages 12 and adapted to change the directions in which the balls 7 roll circulatingly in the raceway passages between the casing 5 and track rail 2. The end caps 6 are provided with recesses 10 just as the casing 5 so that they are saddled on the track rail 2. The balls 7 roll circulatingly and endlessly in the raceways in load regions formed between the raceway grooves 4, 9, and the direction changing passages 11 and return passages 12 in no-load regions. The retainer bands 15 are adapted to retain the balls 7 in the raceway grooves 9 during, especially, the setting and removing of the slider 1 on and from the track rail 7 when the slider 1 comprises a single body.

Figure 4:
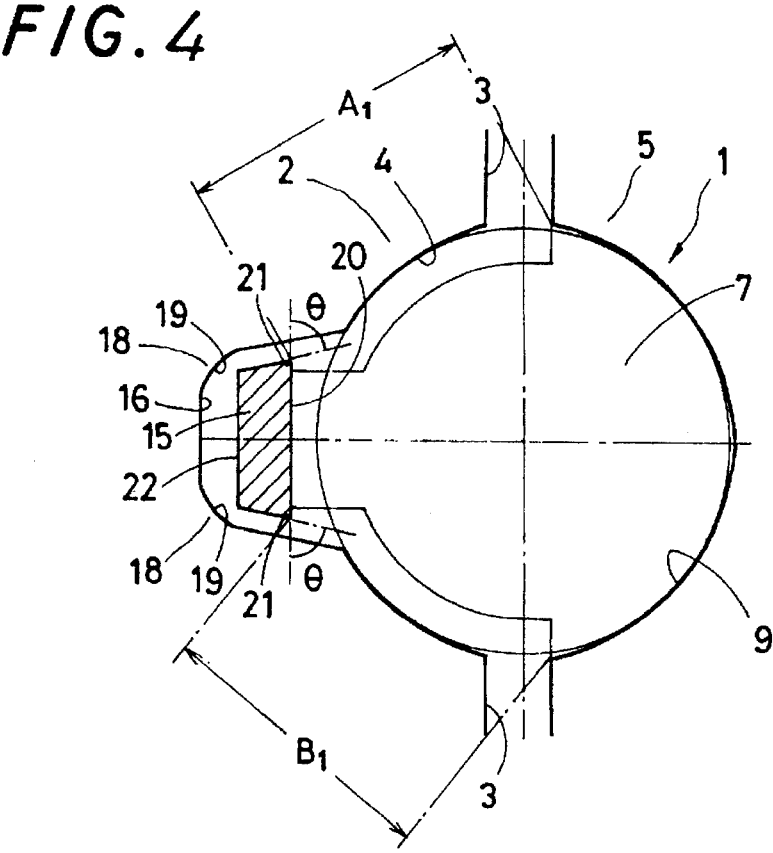
FIG. 4 is an enlarged section showing an example of a retainer band provided between a track rail and a casing in the linear motion rolling guide unit of FIG. 1.

This linear motion rolling guide unit is characterized by, especially, the construction of the retainer bands 15. As shown in FIG. 4, each retainer band 15 comprises a cross-sectionally trapezoidal band member, and is formed by a retaining portion 24 for the balls 7, holding portions 25 bent at right angles at and extending from both ends of the retaining portion 24, and locking portions 26 bent inward and extending from the holding portions 25. The retainer band 15 is held and fixed at its holding portions 25 at both ends of the retaining portion 24 between the relative end cap 6 and side seal 17, the locking portions 26 being engaged with locking recesses 13 formed in side end surfaces of the same end cap 6. As shown in FIG. 4, the retainer band 15 extends along the relative raceway groove 9 in the casing 5, and is fitted in a non-contacting state, i.e., loosely in the relative retainer band fitting groove 16 formed along the relative raceway groove 4 in a side surface 3 of the track rail 2, both of corner portions 21 in the longitudinal direction which continue from a ball-opposed surface 20 for retaining the balls 7 being formed at an acute angle θ. The ball-opposed surface 20 for retaining the balls 7 is longer than a rear surface 22 on the opposite side thereof, whereby the retainer band 15 has a substantially trapezoidal cross-sectional shape. Each of the retainer band fitting grooves 16 formed in the track rail 2 has arcuately curved surfaces 19 at both of the corner portions 21 in the longitudinal direction.

Figure 10:
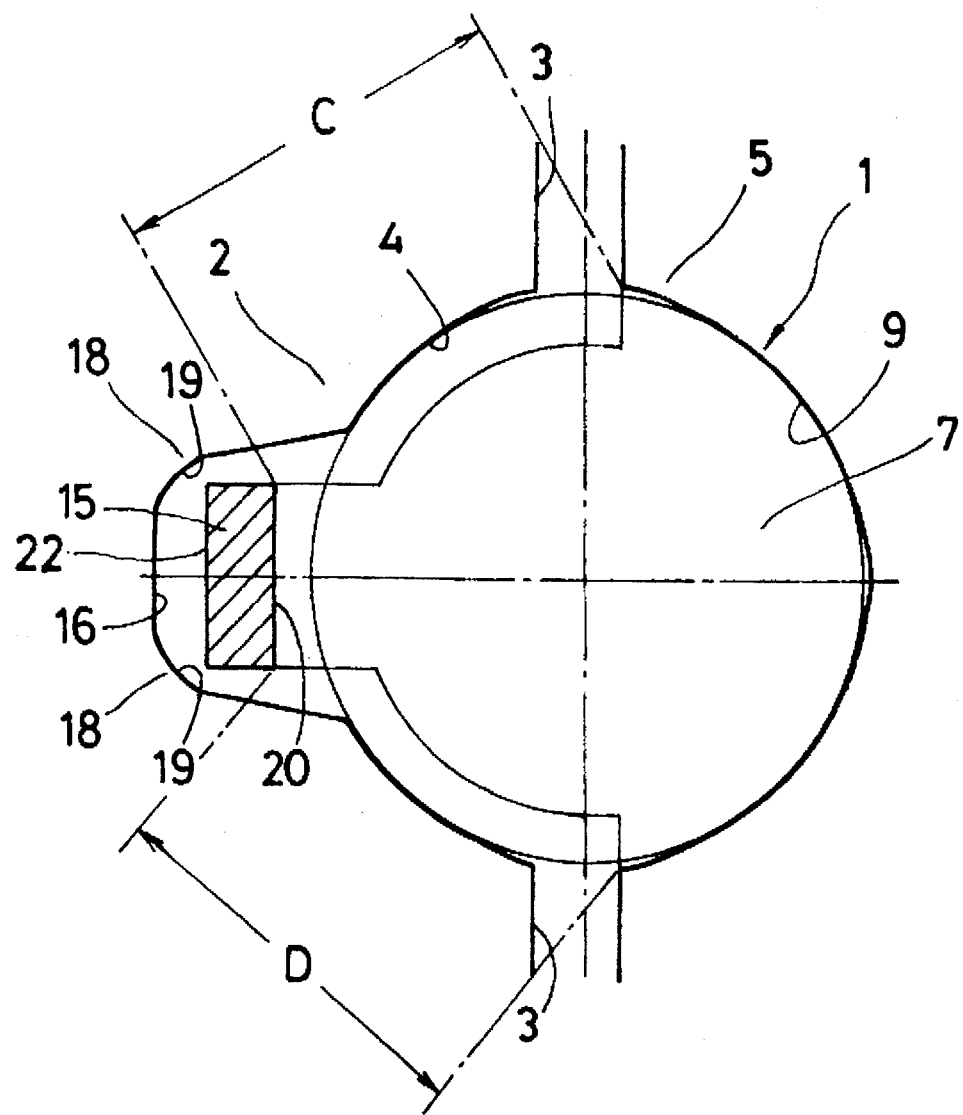
FIG. 10 is an enlarged section showing an example of a retainer band provided between a track rail and a casing in a conventional linear motion rolling guide unit.

Since the retainer band 15 in this linear motion rolling guide unit is formed to the above-mentioned structure having a substantially trapezoidal cross-sectional shape, the width of the ball retaining surface thereof can be set larger than that of the ball retaining surface of the conventional retainer band 15 of a rectangular cross section shown in FIG. 10. This enables a difference between the diameter of a boll 7 and distance $A_1$, or $B_1$, i.e. a ball holding area to be set larger. Namely, in this linear motion rolling guide unit, a distance between a corner portion at an end of a raceway groove 9 in the casing 5 and a corner portion of a side surface of the retainer band 15 fixed to the slider 1, i.e. the distance $A_1$ or $B_1$ can be set short as compared with that between a corner portion at an end of a raceway groove 9 in the casing 9 and a corner portion of a side surface of the retainer band 15 shown in FIG. 10, i.e. a distance C or D. Moreover, both the second moment of longitudinal area (widthwise direction) and second moment of horizontal area (direction of thickness) of the retainer band 15 in the present invention can be set large as compared with those of the conventional cross-sectionally rectangular retainer band shown in FIG. 10. This enables the bending rigidity, i.e. bending strength, deformation resistance and capability of retaining the balls 7 of the retainer band in the present invention to be improved.

Figure 5:
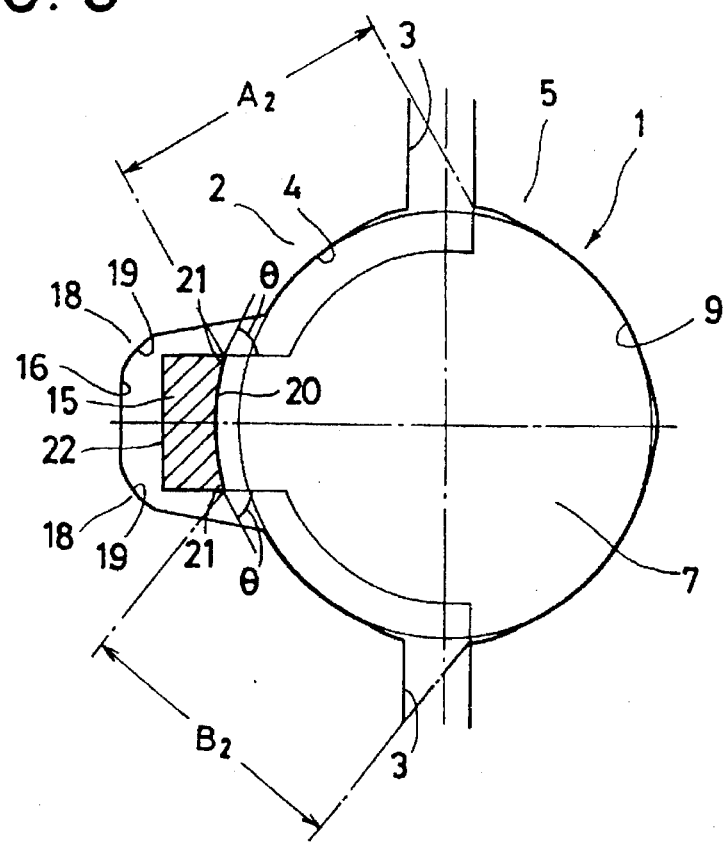
FIG. 5 is an enlarged section showing another example of the retainer band provided between the track rail and casing in the linear motion rolling guide unit of FIG. 1.

Another embodiment of this linear motion rolling guide unit will now be described with reference to FIG. 5. A retainer band 15 in this embodiment is formed so as to have a recessed arcuate ball-opposed surface 20, which is between both of corner portions 21, for retaining balls 7. In this embodiment, the second moment of horizontal area (direction of thickness) of the retainer band 15 becomes smaller than that of the retainer band of FIG. 4 but a holding area for retaining the balls 7 of the former retainer band 15 can be improved as compared with that of the latter retainer band 15. As in the previously-described embodiment, a distance between a corner portion at an end of a raceway groove 9 in a casing 5 and a corner portion of a side surface of the retainer band 15 fixed to a slider 1, i.e. a distance $A_2$ or $B_2$ can be set short as compared with a corresponding distance C or D with respect to the retainer band 15 shown in FIG. 10, whereby a holding area for the balls 7 can be set large.

Still another embodiment of this linear motion rolling guide unit will now be described with reference to FIG. 6. A retainer band 15 for retaining balls 7 in this embodiment has a shape in which the shapes of the retainer bands shown in FIGS. 4 and 5 are combined, and is capable of setting a cross-sectional area and a ball holding area larger than those of the retainer bands shown in FIGS. 4 and 5. Moreover, the second moment of longitudinal area (widthwise direction) and second moment of horizontal area (direction of thickness) of the retainer band shown in FIG. 6 can also be set large as compared with those of the retainer bands shown in FIGS. 4 and 5. This enables the bending rigidity, i.e. bending strength of the retainer band to be increased greatly, and the deformation resistance and the capability of retaining the balls 7 thereof to be improved. As in the previously-described embodiments, a distance between a corner portion at an end of a raceway groove 9 in a casing 5 and a corner portion of a side surface of the retainer band 15 fixed to a slider 1, i.e. a distance $A_3$ or $B_3$ can be set short as compared with a corresponding distance C or D with respect to the retainer band 15 shown in FIG. 10, whereby a holding area for the balls 7 can be set large.

Another embodiment of this linear motion rolling guide unit will be described with reference to FIG. 7. A retainer band 15 in this embodiment has a cross-sectional shape obtained by chamfering 28 the retainer band shown in FIG. 6. A contour of a cross section of the retainer band 15 in the embodiment of FIG. 7 has chamfered portion 28 at both of corner parts 27 in the longitudinal direction thereof which continue from a rear surface 22 on the opposite side of the balls 7, and a cross-sectional shape of the rear surface 22 is set in conformity with that of a retainer band fitting groove 16 in a track rail 2.

Figure 6:
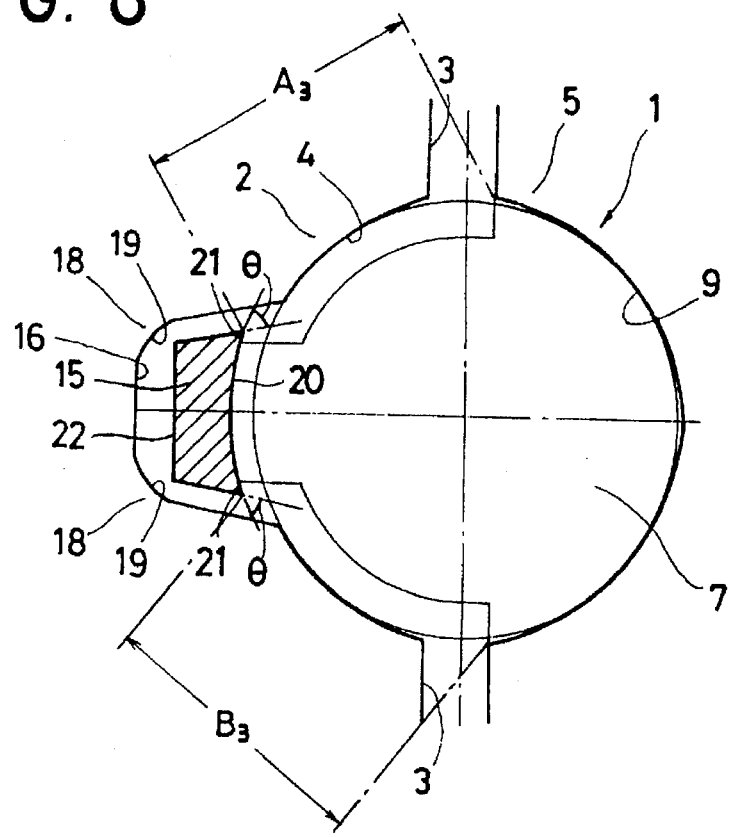
FIG. 6 is an enlarged section showing still another example of the retainer band provided between the track rail and casing in the linear motion rolling guide unit of FIG. 1.
Figure 7:
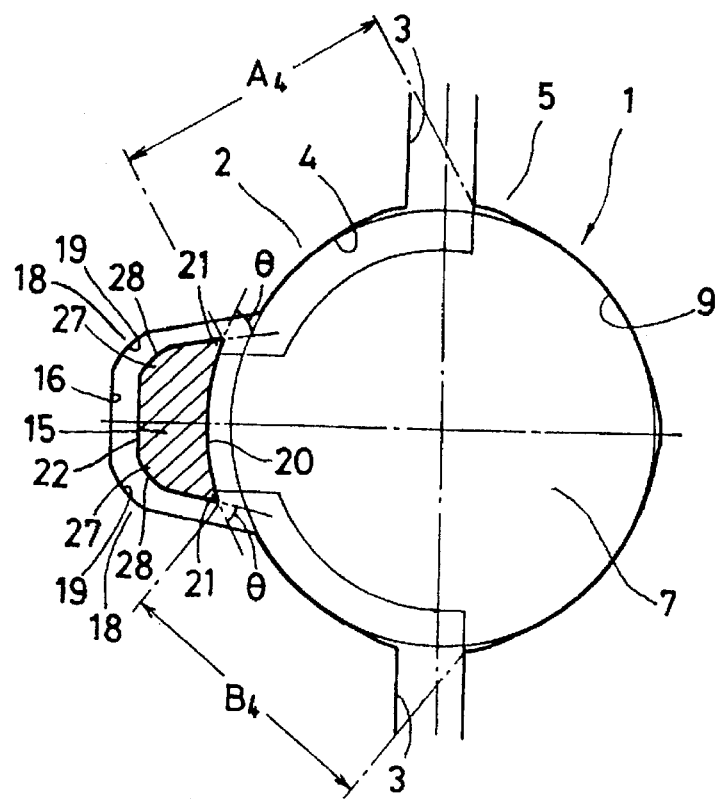
FIG. 7 is an enlarged section showing another example of the retainer band provided between the track rail and casing in the linear motion rolling guide unit of FIG. 1.

In this embodiment, the retainer band 15 for retaining the balls 7 can be formed so that a ball retaining surface area thereof becomes larger than that of the retainer shown in FIG. 6, and, moreover, both the second moment of longitudinal area (widthwise direction) and the second moment of horizontal area (direction of thickness) of the former retainer band can be set larger than those of the latter retainer band. This enables the bending rigidity, i.e. bending strength of the retainer to be increased to a great extent, and the deformation resistance and the capability of retaining the balls 7 thereof to be improved. As in the previously-described embodiment, a distance between a corner portion at an end of a raceway groove 9 in a casing 5 and a corner portion of a side surface of the retainer band 15 fixed to a slider 1, i.e. a distance $A_4$ or $B_4$ can be set short as compared with a corresponding distance C or D with respect to the retainer band 15 shown in FIG. 10, whereby a holding area for the balls 7 can be set large.

The linear motion rolling guide unit according to the present invention is formed as described above, whereby it could be ascertained that a holding area for the balls 7 of the retainer band 15 could be increased by about 4–16% as compared with that of a conventional retainer band of a cross-sectionally rectangular shape, and that the second moment of area of the former retainer band 15 could be increased by about 7–241% as compared with that of the latter retainer band. Therefore, the retainer band in the linear motion rolling guide unit according to the present invention enables the holding area and bending rigidity thereof to be increased, and the deformation resistance, i.e. the property thereof for preventing the retainer band from being deformed to be increased when it is set in a tensed state between the relative end cap 6 and side seal 17 so as to extend along the relative raceway groove 9 in the casing 5, whereby the capability of the retainer band of retaining the balls 7 can be improved to a great extent.

What is claimed is:

1. A linear motion rolling guide unit comprising a track rail having first raceway grooves in both of longitudinal side surfaces thereof; a casing saddled on and slidable to said track rail, said casing being provided with second raceway grooves opposed to said first raceway grooves, and return passages spaced from said second raceway grooves; end caps attached to both of longitudinal ends of said casing and having direction changing passages to allow said second raceway grooves and said return passages to communicate with each other; side seals provided on end surfaces of said end caps; raceway passages formed between said opposed first and second raceway grooves; balls rolling circulatingly in said direction changing passages and said return passages; and retainer bands adapted to retain said balls in said second raceway grooves, said retainer bands extending along said second raceway grooves and being fitted loosely in retainer band fitting grooves formed along said first raceway grooves in said track rail, both of longitudinal corner portions of ball retaining surfaces thereof being formed acutely so as to increase the bending rigidity of said retainer bands and enlarge holding areas for said balls.

2. A linear motion rolling guide unit according to claim 1, wherein each of said retainer bands is formed to a substantially trapezoidal cross-sectional shape, in which the width of said ball retaining surface is set larger than that of a surface on the opposite side thereof.

3. A linear motion rolling guide unit according to claim 1, wherein said ball retaining surface of each of said retainer bands is formed to a recessed arcuate surface between both of corner portions in the longitudinal direction thereof.

4. A linear motion rolling guide unit according to claim 1, wherein both of corner portions in the longitudinal direction of each of said retainer band fitting grooves formed in said track rail have curved surfaces.

5. A linear motion rolling guide unit according to claim 4, wherein each of said retainer bands is chamfered at both of corner portions in the longitudinal direction thereof which continue from a surface thereof which is on the opposite side of said balls, whereby said retainer band is formed so that a cross-sectional contour thereof is in conformity with that of the relative retainer band fitting groove.

6. A linear motion rolling guide unit according to claim 1, wherein both end portions of said retainer bands are held between and fixed to said end caps and said side seals.

7. A linear motion rolling guide unit according to claim 1, wherein the thickness of both of longitudinal end portions of each of said retainer bands is set larger than that of an intermediate portion thereof.

8. A linear motion rolling guide unit according to claim 1, wherein each of said retainer band is formed to a cross-sectionally trapezoidal shape so that said retainer band has a long ball retaining surface, and so as to have a rigidity and a bending strength which are higher than those of a cross-sectionally rectangular retainer band.

9. A linear motion rolling guide unit according to claim 1, wherein said retainer bands are fitted loosely in a non-contacting state, in said retainer band fitting grooves formed along said first race grooves in said track rail.

* * * * *